(No Model.)

2 Sheets—Sheet 1.

C. A. BURT.
MACHINE FOR CAPPING CANS.

No. 377,449. Patented Feb. 7, 1888.

Attest.
John H. Hopkins
P. H. Costich

Inventor.
Chas. A. Burt,
per R. F. Osgood,
Atty.

(No Model.) 2 Sheets—Sheet 2.

C. A. BURT.
MACHINE FOR CAPPING CANS.

No. 377,449. Patented Feb. 7, 1888.

Attest.
John H. Hopkins
P. H. Centieh

Inventor.
Chas. A. Burt,
per R. F. Osgood,
Atty.

UNITED STATES PATENT OFFICE.

CHARLES A. BURT, OF ROCHESTER, NEW YORK.

MACHINE FOR CAPPING CANS.

SPECIFICATION forming part of Letters Patent No. 377,449, dated February 7, 1888.

Application filed March 26, 1887. Serial No. 232,495. (No model.)

*To all whom it may concern:*

Be it known that I, CHARLES A. BURT, of Rochester, in the county of Monroe and State of New York, have invented a certain new and useful Improvement in Machines for Capping Cans; and I do hereby declare that the following is a full, clear, and exact description of the same, reference being had to the drawings accompanying this application.

My improvement relates to that class of machines for capping cans in which the soldering is done by a revolving cylindrical head that has a V-shaped lower edge that fits in the groove in the can-top, and by being revolved spreads the solder without other manipulation. Such devices have before been known; but the solder is usually cut off in small pieces and placed in the groove, or else is placed in a cavity in the top of the soldering-iron, and when fused passes down through holes in the soldering-iron into the groove.

My invention consists in an improved construction and arrangement of parts by which the solder in the form of a wire or a strip is brought up into contact with the exterior surface of the soldering-iron, and is there fused and runs into the groove, where it is spread by the rotation of the iron, all as hereinafter more fully described.

Figure 1:
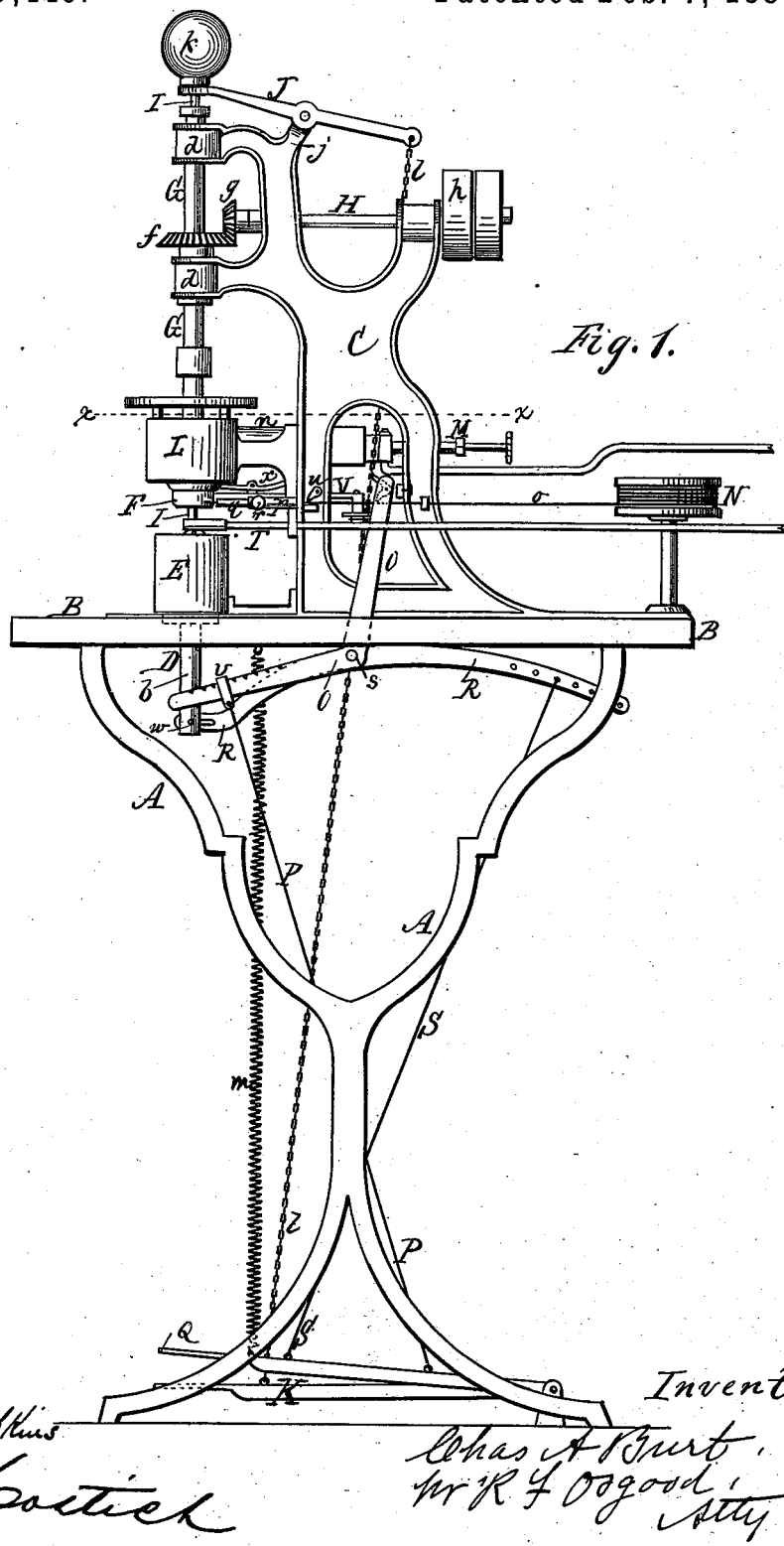
Figure 2:
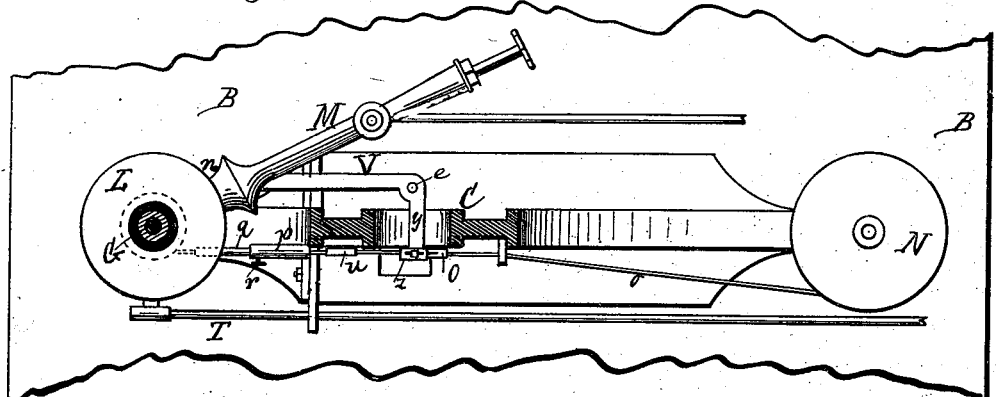
Figure 3:
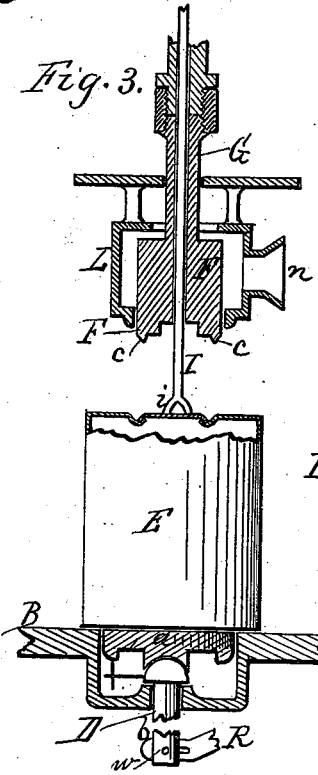
Figure 4:
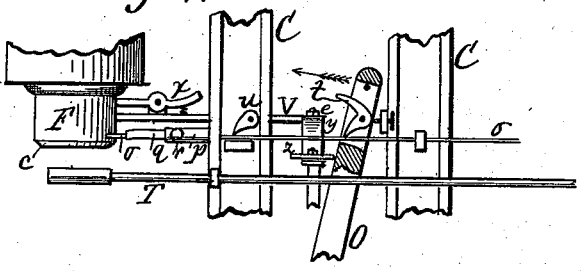
Figure 5:
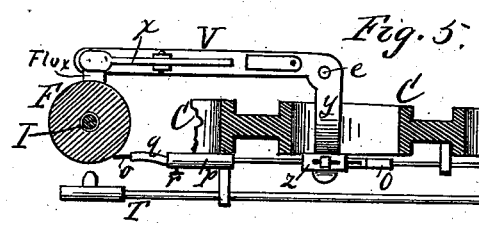
Figure 6:
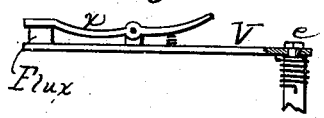

In the drawings, Figure 1 is a side elevation of a can-capping machine, showing my improvement. Fig. 2 is an enlarged cross-section on line $xx$ of Fig. 1, looking downward. Fig. 3 is an enlarged vertical section of the soldering-iron, the heating-chamber that incloses it, the presser-foot and its rod, and a partial section of a can resting on its support. Fig. 4 is a side elevation showing portions of the apparatus. Fig. 5 is a plan view, partly in section, of Fig. 4. Fig. 6 is a view of the clamp.

A indicates the frame, and B the table on which the work is done, said parts being of any suitable construction.

C is a standard erected on the table for supporting the working parts.

D is a support on which are placed the cans E to be operated on, said support consisting simply of a disk or head, $a$, and stem, $b$, and being capable of being raised vertically to bring the can up into contact with the soldering-iron.

F is the soldering-iron, the same consisting of a cylindrical head having a V-shaped lower edge, $c$, that fits into the groove in the top of the can, and by revolving does the soldering when the can is raised into contact with it.

G is a vertical shaft, to which the soldering-iron is attached, said shaft resting in suitable bearings, $d\ d$, of the standard C, and having thereon a bevel-wheel, $f$.

H is a horizontal shaft having its bearings also in the standard C, and having a small bevel-pinion, $g$, that engages with the bevel-wheel $f$. The shaft H is driven by a band on pulley $h$, or by other suitable means.

I is a rod passing loosely through to the shaft G and soldering-iron F, having an open presser-foot, $i$, on its lower end, which presses on the cap of the can. On the upper end of the rod I is a weight, $k$, of sufficient gravity to hold the presser-foot down and hold the cap in firm contact with the can while the soldering is being done. The presser-foot and its rod stand stationary, while the outside shaft and soldering-iron revolve around it.

J is a forked lever that has its bearing on a branch, $j$, of the standard and rests under the weight $k$.

$l$ is a chain or cord connected with the outer end of the lever and extending down and attached to a treadle, K. By pressing on the treadle the presser-foot and shaft will be raised to permit the insertion and removal of the cans. The treadle is drawn up by a spring, $m$.

L is a chamber surrounding the body of the soldering-iron F and having a mouth, $n$, in which is inserted the pipe for conveying gasoline or common illuminating-gas into the chamber, where it is burned in contact with the soldering-iron to produce the necessary heat. The drawings show a gasoline attachment, M; but, if desired, a common gas-pipe and air-pipe may be used in its place.

N is a reel mounted to turn freely, and $o$ is the solder-wire wound thereon. The loose end of the wire is carried through suitable guides and is brought in contact with the exterior surface of the soldering-iron near its lower edge. Here it is melted by contact with the hot iron and runs down into the groove of the can, where it is spread automatically by the turning of the iron.

$p$ is a tube through which the end of the solder-wire passes, and $q$ is a curved or bent tube forming a nozzle resting in said fixed tube and secured by a set-screw, r, that allows the nozzle to turn to any position and then be fixed by turning up the set-screw. The bend in the nozzle enables any adjustment of the end of the wire against the soldering-iron to be attained, which is important to get the best effects of the soldering and to prevent waste of the solder, as it can be adjusted to bear more or less against the iron.

O is an elbow-shaped lever, pivoted at s on the under side of the table B, the lower arm extending horizontally or angularly under the table, and the upper end extending up into the path of the solder-wire, and said wire passing through an opening or slot of the arm as it passes to the soldering-iron.

t is a weighted pawl or catch pivoted in the upper arm of lever O above the wire, its point bearing on top of the wire, and u is a similar pawl forming a detent pivoted to the standard C and catching the wire as it passes through. It will be seen that at each forward stroke of rock-lever O the pawl t attached thereto will catch the wire and feed it forward, and at each back-stroke of said lever the pawl u will catch and hold the wire while the pawl t slides over it to get a new hold. By this means the action is automatic and the wire will be fed forward intermittingly and of just sufficient length to furnish the requisite quantity to solder one can.

P is a connecting-rod extending from the lower arm of rock-lever O down to a treadle, Q, by depressing which the rock-lever will be operated. The upper end of this connecting-rod P is attached to a slide, v, that can be moved forward and back on lever O, thereby increasing or lessening the stroke of the lever, and consequently feeding more or less of the solder-wire forward to solder larger or smaller cans.

R is another rock-arm on the under side of the table B, attached to the same pivot, s, its forward end being pivoted at w to the lower end of the support D, by which means, when the rock-arm is operated, said support will be raised to raise the can against the soldering-iron. To the outer end of this rock-arm is attached a connecting-rod, S, that extends down, crossing the other connecting-rod, P, and attached to the same treadle, Q. Therefore the same movement that feeds the solder-wire forward to the soldering-iron will simultaneously bring up the can to be soldered. The upper end of connecting-rod S can be changed to different holes in the rock-arm R, so as to grade the movement to cans of different height. To solder cans of different sizes, the soldering-iron F has to be changed, provision being made for this by jointing the shaft G.

T is an air-pipe located at any desired position and having a nozzle that rests a little above the top of the can when lowered. This pipe is supplied with cold air by a blower or other means, and when the can is lowered after being sealed the cold air plays on its top and cools it off. When the can is raised, the air-blast does not reach it.

V is a horizontal arm pivoted at e, and having a right-angled end, y, that extends inward and rests in front of the rock-lever O. When the rock-lever is thrown forward, the arm V is swung outward by it away from the soldering-iron. A torsion or other spring is used to force the arm V in toward the soldering-iron.

x is a spring-clamp on top of the arm V, said clamp serving to hold a piece of sal-ammoniac and to bring it in contact with the side of the soldering-iron when the rock-arm O is thrown back. On the right-angled end y is a slide, z, capable of being adjusted forward and back by a set-screw that passes through the slot of the slide, said slide receiving the contact of rock-arm O as it is thrown forward. By this means it can be adjusted to throw arm V out more or less.

By the use of the external solder-wire fed forward automatically, as described, the execution is very rapid, and the same exact amount of solder is used on each can, and a great saving of material is effected, besides which there is no tendency to dross and fill the passages, which occurs when the solder is fed down through openings in the soldering-iron.

The support D, consisting of the parts a b, is made with a ball-and-socket joint, and is also inclosed by a curbing, as shown in Fig. 3, by which means, when the support is raised to elevate the can, it has freedom of motion and can adjust itself so as to bring the top of the can square with the edge of the soldering-iron, and so that the said edge of the soldering-iron can come in contact with the can at all points of the circle. If the support were stiff, any irregularity in the can would prevent the soldering-iron from coming in contact at all points, as it should do. Any equivalent means may be used to produce the same result. Two or more soldering-irons may be used, in which case two or more cans are raised simultaneously from the tray.

Having described my invention, what I claim as new, and desire to secure by Letters Patent, is—

1. In a machine for capping cans, the combination, with the soldering-iron, of a nozzle or guide having a bend and capable of being turned to different positions, whereby the solder-wire is brought against different portions of the side of the soldering-iron, as specified.

2. The support D, formed in two parts, a b, connected by a ball-and-socket joint, in combination with the inclosing-curbing of the table B, substantially as and for the purpose herein specified.

3. The combination of the soldering-iron, means for guiding the solder-wire thereto, lever O, for feeding the solder-wire forward, treadle Q, connecting-rod P, lever R, for raising the cans up to the soldering-iron, and connecting-rod S, connecting the said lever R to the said treadle Q, whereby when the cans are raised to be soldered the solder-wire is fed to the soldering-iron and always at the same moment.

4. In a machine for capping cans, the combination, with the soldering-iron, of a rock-lever provided with means, substantially as described, to feed the solder-wire forward, and a pivoted clamp holding a suitable flux, the parts connected, substantially as set forth, so that the forward movement of the rock-lever will operate the clamp, as specified.

5. The combination, with the soldering-iron, of the rock-arm provided with means, substantially as described, to feed the solder-wire forward, the pivoted clamp holding a suitable flux, and an adjustable slide on the clamp against which the rock-arm strikes to operate the clamp, as specified.

In witness whereof I have hereunto signed my name in the presence of two subscribing witnesses.

CHARLES A. BURT.

Witnesses:
 THOS. KELL BRADFORD,
 LEE PURCELL.